United States Patent
Nysæter et al.

(10) Patent No.: US 10,745,102 B2
(45) Date of Patent: Aug. 18, 2020

(54) SWINGABLE ARM MOUNT FOR AN AERIAL VEHICLE HAVING A LIFT GENERATING MEANS, AND AN AERIAL VEHICLE, ADVANTAGEOUSLY A MULTICOPTER WITH A SWINGABLE ARM MOUNT

(71) Applicant: GRIFF AVIATION AS, Sykkylven (NO)

(72) Inventors: Jan Martin Nysæter, Sykkylven (NO); Hans Petter Førde, Sykkylven (NO); Leif Johan Holand, Sykkylven (NO)

(73) Assignee: GRIFF AVIATION AS, Sykkylven (NO)

( * ) Notice: Subject to any disclaimer, the term of this patent is extended or adjusted under 35 U.S.C. 154(b) by 341 days.

(21) Appl. No.: 15/651,798

(22) Filed: Jul. 17, 2017

(65) Prior Publication Data

US 2019/0016435 A1    Jan. 17, 2019

(51) Int. Cl.
*B64C 1/30*    (2006.01)
*B64C 39/02*    (2006.01)

(52) U.S. Cl.
CPC .............. *B64C 1/30* (2013.01); *B64C 39/024* (2013.01); *B64C 2201/027* (2013.01); *B64C 2201/042* (2013.01); *B64C 2201/108* (2013.01); *B64C 2201/146* (2013.01)

(58) Field of Classification Search
CPC ................ B64C 1/30; B64C 2201/027; B64C 2201/042; B64C 2201/108; B64C 2201/146; B64C 39/024
See application file for complete search history.

(56) References Cited

U.S. PATENT DOCUMENTS

| | | | | |
|---|---|---|---|---|
| 4,450,364 A | * | 5/1984 | Benoit | F03D 9/25 290/55 |
| 6,666,404 B1 | * | 12/2003 | Wingert | B64C 27/20 244/17.19 |
| 7,183,663 B2 | * | 2/2007 | Roberts | F03D 13/20 290/44 |
| 7,302,316 B2 | * | 11/2007 | Beard | G01C 23/005 244/75.1 |
| 7,325,772 B1 | * | 2/2008 | Hanewinkel, III | B64D 13/00 165/41 |

(Continued)

FOREIGN PATENT DOCUMENTS

| | | |
|---|---|---|
| CN | 105366032 A | 3/2016 |
| CN | 105691590 A | 6/2016 |

(Continued)

OTHER PUBLICATIONS https://www.youtube.com/watch?v=LyfeceC8WXw, "Griff Aviation's Giant Heavy Lift Drone", published May 9, 2017.

(Continued)

*Primary Examiner* — Medhat Badawi
(74) *Attorney, Agent, or Firm* — Arent Fox LLP

(57) ABSTRACT

An aerial vehicle having an arm for supporting an a lift generating means, the aerial vehicle being advantageously a multicopter, comprising an arm mount means for swinging an arm supporting the lift generating means between a retracted position and an extended locked and releasable position.

3 Claims, 7 Drawing Sheets

(56) References Cited

U.S. PATENT DOCUMENTS

| | | | | |
|---|---|---|---|---|
| 7,675,189 B2* | 3/2010 | Grenier | F03D 15/00 | 290/54 |
| 7,699,260 B2* | 4/2010 | Hughey | B64C 31/028 | 244/17.11 |
| 7,712,701 B1* | 5/2010 | Ehrmantraut | B64C 27/20 | 244/17.23 |
| 7,959,104 B2* | 6/2011 | Kuntz | A63H 17/00 | 244/2 |
| 8,052,081 B2* | 11/2011 | Olm | B64C 39/024 | 244/17.23 |
| 8,083,173 B2* | 12/2011 | Arlton | B64C 39/024 | 244/17.23 |
| 8,128,033 B2* | 3/2012 | Raposo | A63H 23/00 | 244/171.2 |
| 8,322,648 B2* | 12/2012 | Kroetsch | A63H 27/12 | 244/17.23 |
| 8,328,130 B2* | 12/2012 | Goossen | B64C 27/20 | 244/23 A |
| 8,453,962 B2* | 6/2013 | Shaw | B64C 27/20 | 244/12.4 |
| 8,662,438 B2* | 3/2014 | Savoye | A63H 27/12 | 244/17.11 |
| 8,774,982 B2* | 7/2014 | Oakley | B64C 27/08 | 701/2 |
| 8,794,566 B2* | 8/2014 | Hutson | B64C 39/024 | 244/17.17 |
| 8,844,860 B2* | 9/2014 | Lundgren | B64C 39/024 | 244/17.13 |
| 9,051,050 B2* | 6/2015 | Achtelik | B64C 27/08 | |
| 9,387,939 B2* | 7/2016 | Lundgren | B64D 47/08 | |
| 9,957,045 B1* | 5/2018 | Daly | B64C 37/02 | |
| 2002/0104921 A1* | 8/2002 | Louvel | A63H 27/04 | 244/12.1 |
| 2002/0106966 A1* | 8/2002 | Jimenez | A63H 27/00 | 446/454 |
| 2005/0061910 A1* | 3/2005 | Wobben | B64C 27/20 | 244/17.23 |
| 2006/0226281 A1* | 10/2006 | Walton | B64C 27/20 | 244/17.23 |
| 2008/0033684 A1* | 2/2008 | Vian | F41G 7/303 | 702/113 |
| 2008/0210809 A1* | 9/2008 | Arlton | A63H 27/02 | 244/17.11 |
| 2009/0201380 A1* | 8/2009 | Peaslee | G06T 7/20 | 348/208.4 |
| 2009/0250549 A1* | 10/2009 | Wiggerich | B64C 27/20 | 244/17.11 |
| 2009/0284644 A1* | 11/2009 | McKaughan | G01C 3/08 | 348/348 |
| 2010/0019098 A1* | 1/2010 | Collette | B64C 27/20 | 244/23 A |
| 2010/0044499 A1* | 2/2010 | Dragan | B64C 1/30 | 244/17.23 |
| 2010/0120273 A1* | 5/2010 | Lucero | H05K 1/02 | 439/79 |
| 2010/0243794 A1* | 9/2010 | Jermyn | A63H 27/12 | 244/17.23 |
| 2011/0001020 A1* | 1/2011 | Forgac | B64C 29/0033 | 244/7 A |
| 2012/0056041 A1* | 3/2012 | Rhee | B64C 25/32 | 244/4 R |
| 2012/0153087 A1* | 6/2012 | Collette | B64C 27/20 | 244/23 A |
| 2013/0068892 A1* | 3/2013 | Bin Desa | B64C 39/024 | 244/190 |
| 2014/0117149 A1* | 5/2014 | Zhou | A63H 27/12 | 244/17.23 |
| 2014/0131510 A1* | 5/2014 | Wang | B64C 39/024 | 244/17.23 |
| 2014/0138476 A1* | 5/2014 | Bystrom | B64C 29/0033 | 244/17.13 |
| 2014/0138477 A1* | 5/2014 | Keennon | B64C 27/12 | 244/17.23 |
| 2015/0321755 A1 | 11/2015 | Martin et al. | | |
| 2016/0340028 A1* | 11/2016 | Datta | B64C 39/024 | |
| 2017/0036771 A1* | 2/2017 | Woodman | B64C 39/024 | |
| 2017/0043870 A1* | 2/2017 | Wu | B64C 27/08 | |

FOREIGN PATENT DOCUMENTS

| | | |
|---|---|---|
| CN | 106741838 A | 5/2017 |
| CN | 106927017 A | 7/2017 |
| KR | 101527544 B1 | 6/2015 |

OTHER PUBLICATIONS

Search Report issued in Norwegian Patent Application No. 20171194 dated Jan. 4, 2018.

* cited by examiner

SWINGABLE ARM MOUNT FOR AN AERIAL VEHICLE HAVING A LIFT GENERATING MEANS, AND AN AERIAL VEHICLE, ADVANTAGEOUSLY A MULTICOPTER WITH A SWINGABLE ARM MOUNT

INTRODUCTION

The present invention relates to an aerial vehicle, AV, more specifically a multicopter operable as a remote controlled drone, as specified in the preamble of the accompanying patent claims.

An object of the present invention is to provide a rotor-wing multicopter type AV with a plurality of motors, advantageously operable as a drone, and designed to carry fixed and sling heavy cargo loads, advantageously heavy loads in a range of from about 300 kg to about 500 kg.

The inventors have in the development of the invention found that by positioning upper and lower engines and propellers in an arrangement of bracket arms illustrated and described herein, and with upper and lower engines and propellers turning in opposite directions, momentary rotations are advantageously avoided. Switch And Lock system is a mechanism that enables easy, fast modification of the UAV, in particular to accommodate fast deployment. The rotor arms can be easily unfolded by swinging from a retracted to a safely locked extended position for flight, or be rapidly folded by swinging the rotor arms in toward the airframe of the AV for easy and compact transportation. The AV of the invention enables also the option to choose the optimal number of rotors to be engaged at all times for increased flight time or maximum lifting capability. The switching mechanism advantageously comprises a central spindle that is rotatably attached to the airframe of the AV. Pairs of rotor arms are advantageously attached to respective first and second ends of the central spindle.

The locking mechanism consists of a spring loaded locking cotter pin that slides into the central spindle on predefined rotation angles of the rotor arms

SUMMARY OF THE INVENTION

The invention provides a swingable arm mount for an aerial vehicle having a lift generating means, the aerial vehicle being advantageously a multicopter, according to the specification provided in the accompanying patent claim 1.

Features of advantageous embodiments of the arm mount of the invention according to claim 1 are recited in the accompanying patent claim 2.

The invention provides an aerial vehicle, advantageously a multicopter, according to the specification provided in the accompanying patent claim 3.

BRIEF DESCRIPTION OF THE DRAWINGS

In the following, the invention will be described by way of example and with reference to the accompanying drawings, in which.

DETAILED DESCRIPTION OF THE INVENTION

For simplicity, in the following a motor/propeller arm bracket is referred to as an arm, and a chassis or frame is referred to as a body.

Figure 1:
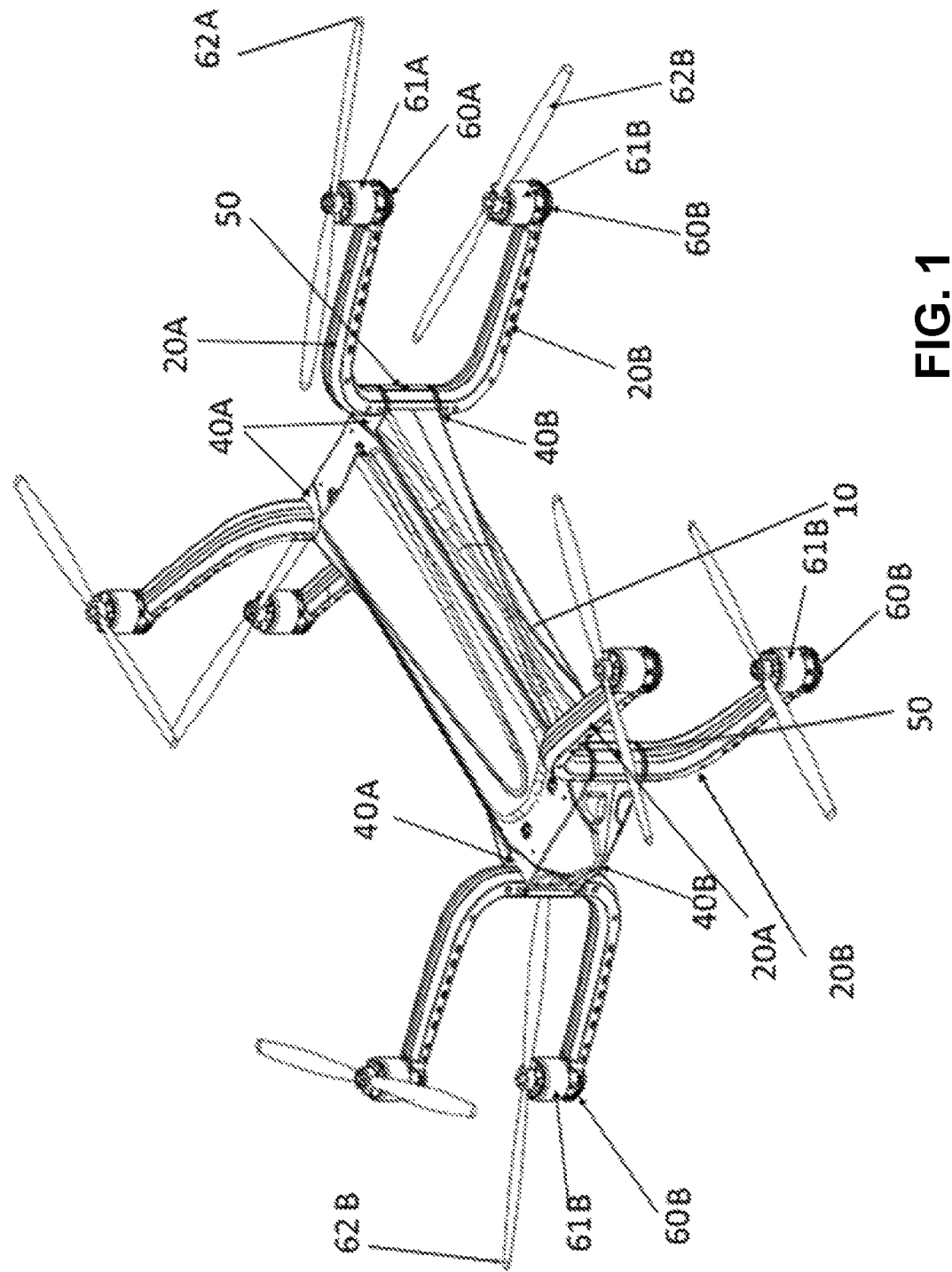
FIG. 1 is a first perspective view drawing illustrating an embodiment of a multicopter drone according to the invention.

Reference is first made to the drawing of FIG. 1, illustrating a complete rotor-wing multicopter according to the invention in a configuration with arms swinged out from the body and locked, ready for flight. In this drawing is identified a substantially rectangular body 10, a plurality of upper arm attachment brackets 40A attached to the body so as to form upper corner portions the body rectangle, a plurality of lower arm attachment brackets 40B attached to the body so as to form lower corner portions the body rectangle, a plurality of upper arms 20A hinged to and extending upwards and outwards from respective ones of said respective upper portions of corners of the body rectangle, a plurality of lower arms 20B hinged to and extending downwards and outwards from respective ones of said lower portions of corners of the body rectangle, a plurality of upper motor supports 60A attached at respective ones outer ends of each of the upper arms 20A, a plurality of lower motor supports 60B attached at respective ones outer ends of the lower arms 20B, a plurality of upper motors 61A each with an upper motor driven propeller or rotor 62A and mounted on respective ones of the upper motor supports 60A, and a plurality of lower motors 61B each with an upper motor driven propeller or rotor 62B and mounted on respective ones of the lower motor supports 60B. The body is arranged to carry at least power or fuel controller arrangement for controlling the power applied to drive rotation of the propellers. In an wireless embodiment, the body is also adapted to accommodate an source of power or fuel for the motors and the controller. The motors 61A, 61B are advantageously electrical motors, and the source of power is an electric battery, a solar panel, or other means for providing or generating electrical power on-board the aerial vehicle of the invention. Each pair of upper 20A and lower 20 arms that are mounted on the body at a same corner portion and are joined to each other by a swing spindle (not shown in FIG. 1) that is journaled in a respective pair of the upper 40A and lower 40B arm attachment brackets, thereby forming swingable arm pair which is swingable between an extended arm position and a retracted arm position. A cover 50 attachable to the body is provided at each of said corner so as to provide at least protection for the swing spindle (not shown in FIG. 1) and their journaling arrangement in the respective pairs of the upper 40A and lower 40B arm attachment brackets.

Figure 2A:
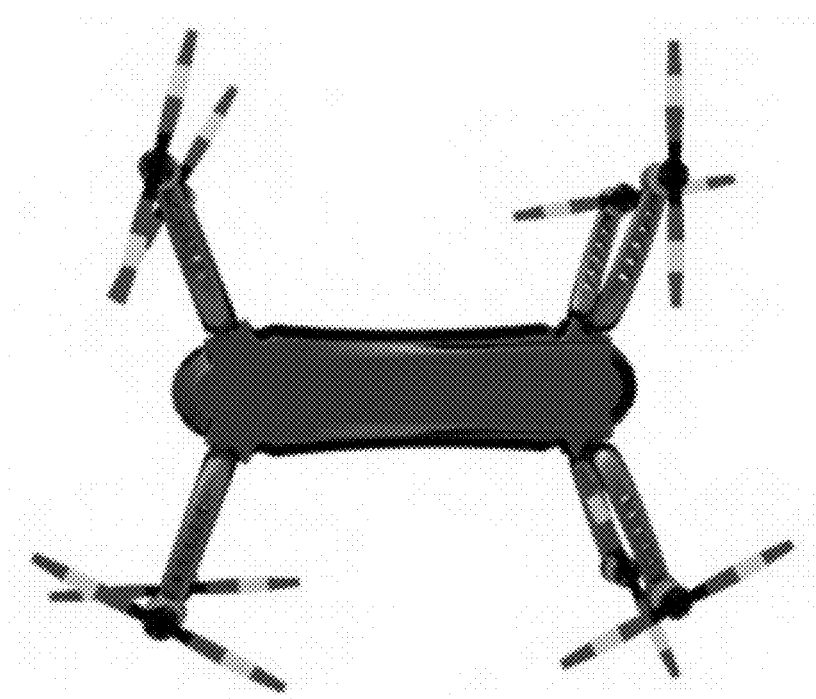
FIG. 2A is a second top perspective view photography illustrating the embodiment of a multicopter drone according to the invention illustrated in FIG. 1.

Reference is made to FIG. 2A, illustrating in a perspective view photography from above an embodiment of the AV of the invention. In this FIG. 2A, due to the perspective view point being slightly off center and to the left with respect to the body center, two sets of upper and lower arms of two arm pairs clearly distinguishable in the right hand part of the photo, while in the left hand side of the photo each of the upper arms substantially overlap with and hide most of the respective underlying arms of respective arm pairs leaving visible and clearly distinguishable only parts of the motors and their respective propellers or rotor blades of each respective arm.

Figure 2B:
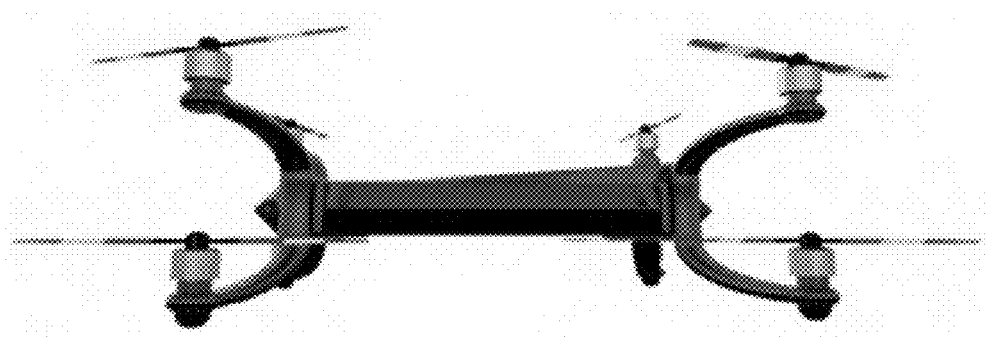
FIG. 2B is a third side perspective view photography illustrating the embodiment of a multicopter drone according to the invention illustrated in FIGS. 1 and 2A.

Correspondingly as for FIG. 2A, in FIG. 2B, illustrating in a perspective view photography from the side of the embodiment of the AV of the invention shown in FIG. 2A, the body as well as each of the upper and lower arms substantially overlap with and hide most of the respective neighbouring upper and lower arms, respectively, leaving visible and clearly distinguishable only parts of the motors and their respective propellers or rotor blades of the arms most distantly located with respect to the camera position.

Figure 3:
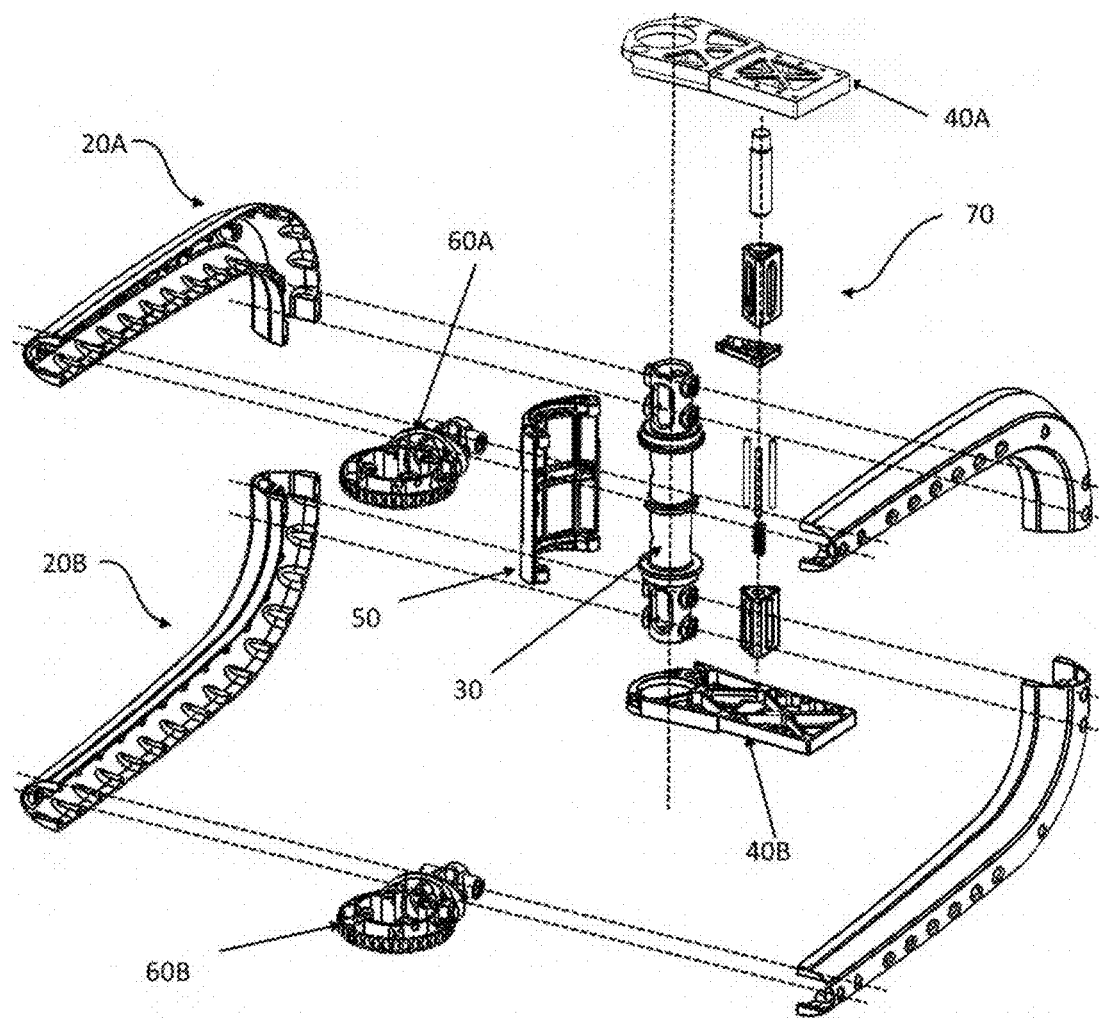
FIG. 3 is an exploded view drawing illustrating components of an embodiment of a motor/propeller arm bracket arrangement comprised in the embodiment of a multicopter drone according to the invention illustrated in FIGS. 1, 2A, and 2B.
Figure 4:
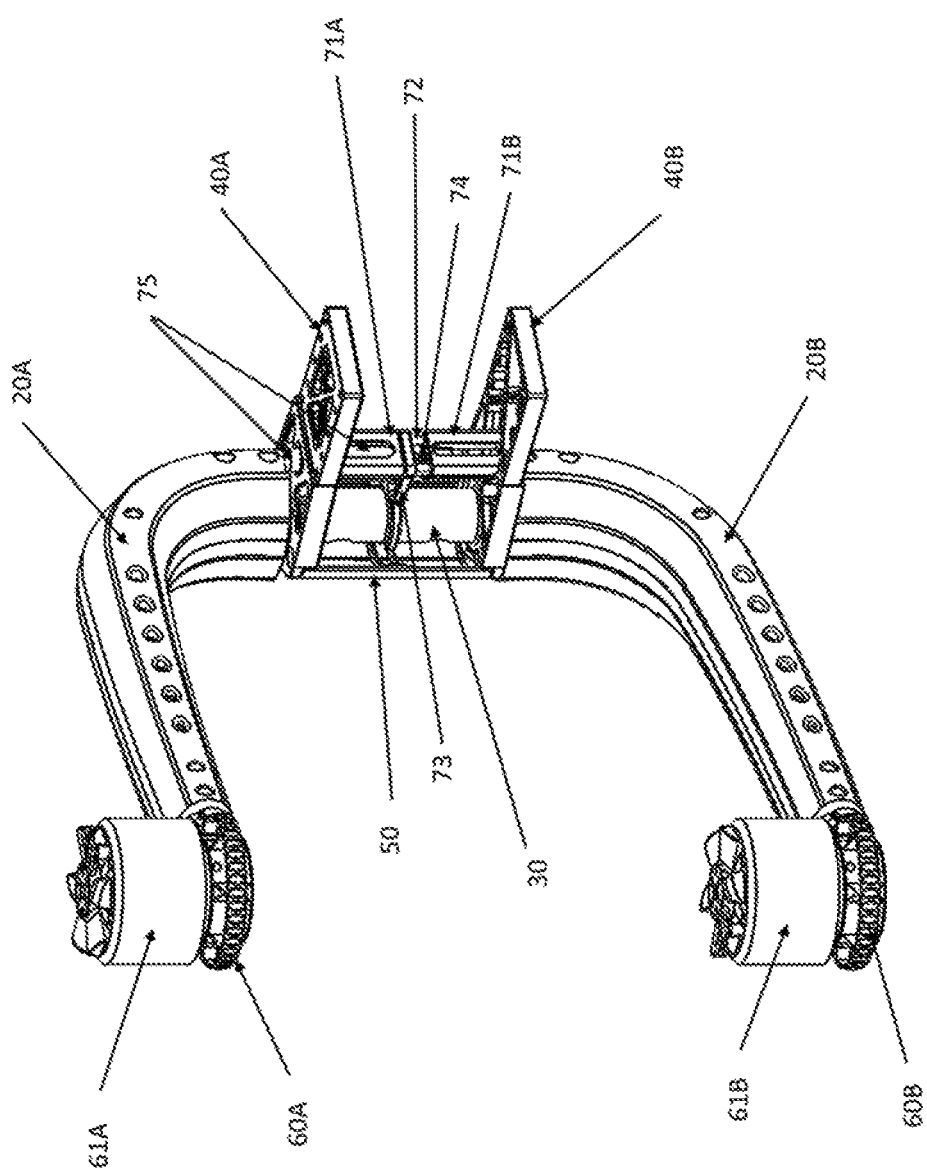
FIG. 4 is a side perspective view partial assembly drawing illustrating the embodiment of a motor/propeller arm bracket arrangement illustrated in FIG. 3.

Reference is made to FIG. 3, providing a first perspective exploded view illustration of components of the swingable arm arrangement in a AV according to the invention. In this embodiment, each of the upper 20A and lower 20B arms are formed by respective first and second arm halves locatable on respective extreme left and right hand sides of the drawing. A plurality of circular features on the arm halves indicate positions of fasteners for joining the arm halves to form the arms. In conjunction with circular features at inner portions of the arms are also drawn a first pair of adjacently located dotted lines to indicate circular features that represent positions for fasteners that at inner ends accommodate fasteners for attaching the arms of an arm pair to upper and lower portions of the swing spindle 30, and in conjunction with circular features at outer portions of the arms are also drawn a second pair of adjacently located dotted lines to indicate circular features that represent positions for fasteners that at outer arm ends accommodate fasteners for attaching the arms of an arm pair to respective ones of upper 60A and lower 60B motor supports. Upper and lower portions of the centrally located swing spindle 30, with a generally tubular form, fits into openings in respective large circular openings in respective ones of the upper 40A and lower 40B arm attachment brackets, which in turn are adapted to fit with a mounting arrangement on a corner of the body. A dotted line running through a longitudinal central axis of the swing spindle 30 and the large circular openings in the upper 40A and lower 40B arm attachment brackets indicate a vertical line along which these are to be assembled. Two smaller openings in each the upper 40A and lower 40B arm attachment brackets, located on opposite sides of the large circular openings in which the swing spindle is to be received, accommodate for screws that fit into corresponding openings at upper and lower ends of the cover 50 for affixing the cover to the upper 40A and lower 40B arm attachment brackets. Thereby, the cover 50 also serves to maintain and fix a separation of the associated parts of the upper 40A and lower 40B arm attachment brackets. A swing lock arrangement, components of which are collectively indicated by the numeral 70, is provided for each swing spindle 30 to keep an arm pair locked in at least one of the extended and retracted positions Reference is made to FIG. 4, providing a first perspective view assembly illustration of components illustrated in FIG. 3 assembled into a swingable arm pair system ready for mounting on a body to form a AV according to the invention. In this assembly the upper 60A and lower 60B motor supports are also provided with an upper motor 61A and a lower motor 61B, respectively, and the pair of swingable arms 20A, 20B is positioned in a retracted position with respect to the upper 40A and lower 40B arm attachment brackets. The swing spindle lock arrangement 70 comprises a pair of upper 71A and lower 71B guide supports, a plurality of guide rods 72 having first and second ends adapted to be retained in bores in ends of respective ones of the upper 71A and lower 71B guide supports, a plate shaped cotter pin 73 with a plurality of parallel through holes adapted to receive respective ones of the of the guide rods 72 so as to provide back and forth sliding cotter pin 73 in a longitudinal direction of the guide rods 72 arranged in parallel, a return spring 74, and an elongated release button 75. When assembled, and held in position between a pair of the upper 40A and lower 40B arm attachment brackets, sliding cotter pin 73 is slideable on the guide rods in a gap between the upper 71A and lower 71B guide supports between a lock position and a release position, and generally held in the lock position by a spring arranged to urge the cotter pin to the lock position. In the lock position of the cotter pin in the gap between the upper 71A and lower 71B guide supports, the cotter pin is level with a cam arranged on a central portion of the swing spindle 30, and a protruding end portion of the cotter pin is either riding on a side of the cam or is disposed in a notch in the cam. When in a notch of the cam, the spindle may be rotated until an edge of the cam abuts an edge of the cotter pin and at that point be blocked from further rotation by the cotter pin. The elongated release button is disposed within an associated one of the upper 71A and lower 71B guide supports that is at the opposite side of the plate shaped cotter pin with reference to the location of return spring 74, and has one end resting on or located adjacently to a facing surface of the cotter pin and an opposite end protruding out from its associated guide support. Hence, by applying a pushing force on the protruding end of the release button 75, in a direction against the force of the return spring 74, the cotter pin will slide along the guide rods to a position where it is no longer at level with the cam. When not at level with the cam of the swing spindle, there is no interaction between the cam and the cotter pin, and the swing spindle is free to rotate by its journaling in the large openings in the upper the upper 40A and lower 40B arm attachment brackets. If the release button 75 is released while an elevated portion of the cam is facing the protruding end of the cotter pin, then the return spring 74 will make the cotter pin rest on and be forced against a side of the cam until the swing spindle 30 has been rotated sufficiently for a cam notch to be positioned to allow the protruding end of the cotter pin to move again to the lock position in the gap between the upper 71A and lower 71B guide supports.

Figure 5A:
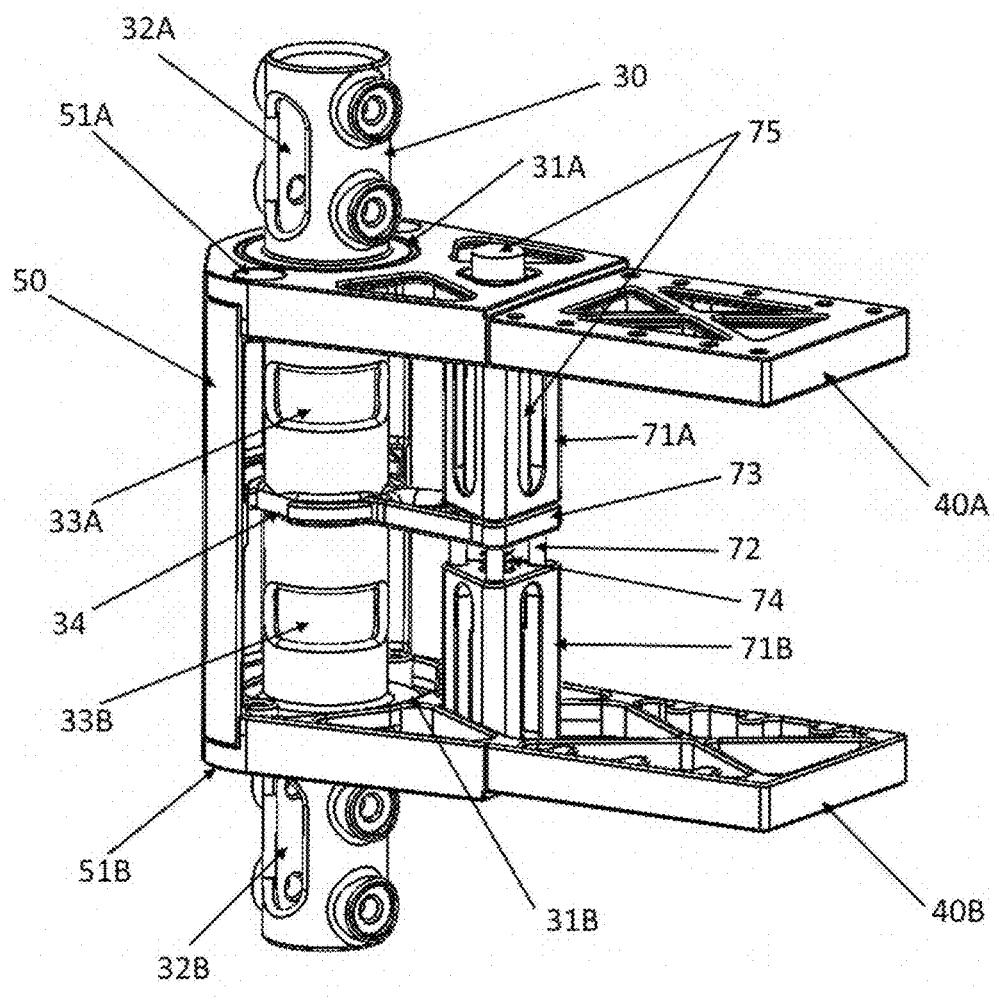
FIG. 5A is a side perspective view partial assembly drawing illustrating an embodiment of a motor/propeller arm bracket swing and locking/releasing arrangement in the embodiment of a motor/propeller arm bracket arrangement illustrated in FIGS. 3 and 4.

Reference is made to FIG. 5A, providing a second perspective view assembly drawing illustrating a partial assembly not comprising the arms and arm related components illustrated in FIG. 3. In this illustration is shown also upper 32A and lower 32B openings in the hollow swing spindle for running control, power, or fuel lines between the swing spindle and items mounted on respective ones of upper 20A and lower 20B arms, and upper 32A and lower 32B central openings in the hollow swing spindle for running said control, power, or fuel lines between the swing spindle and equipment disposed in the body of the AV of the invention. Other components and elements shown in this drawing correspond to what has been illustrated in FIG. 4.

Figure 5B:
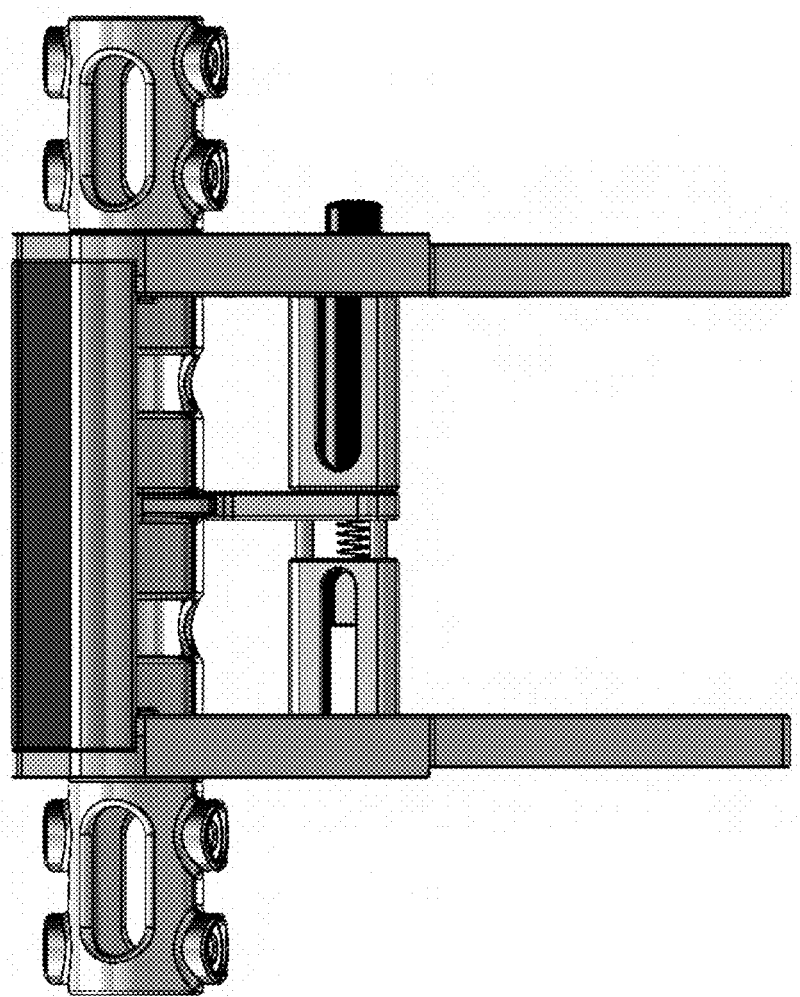
FIG. 5B is a side view partial assembly drawing illustrating the embodiment of a motor/propeller arm bracket swing and locking/releasing arrangement illustrated in FIG. 5A.

Reference is made to FIG. 5B, providing a second side view assembly drawing illustrating the partial assembly illustrated in FIG. 5A, with a clearer view of the return spring and the elongated release button in this embodiment disposed in the upper 71A guide support. The cotter is pin clearly at level with the cam portion 34 of the swing spindle 30, accordingly, the cotter pin is in a locking position, with the protruding end of cotter pin disposed in a notch or "valley" in the cam 34.

Figure 6:
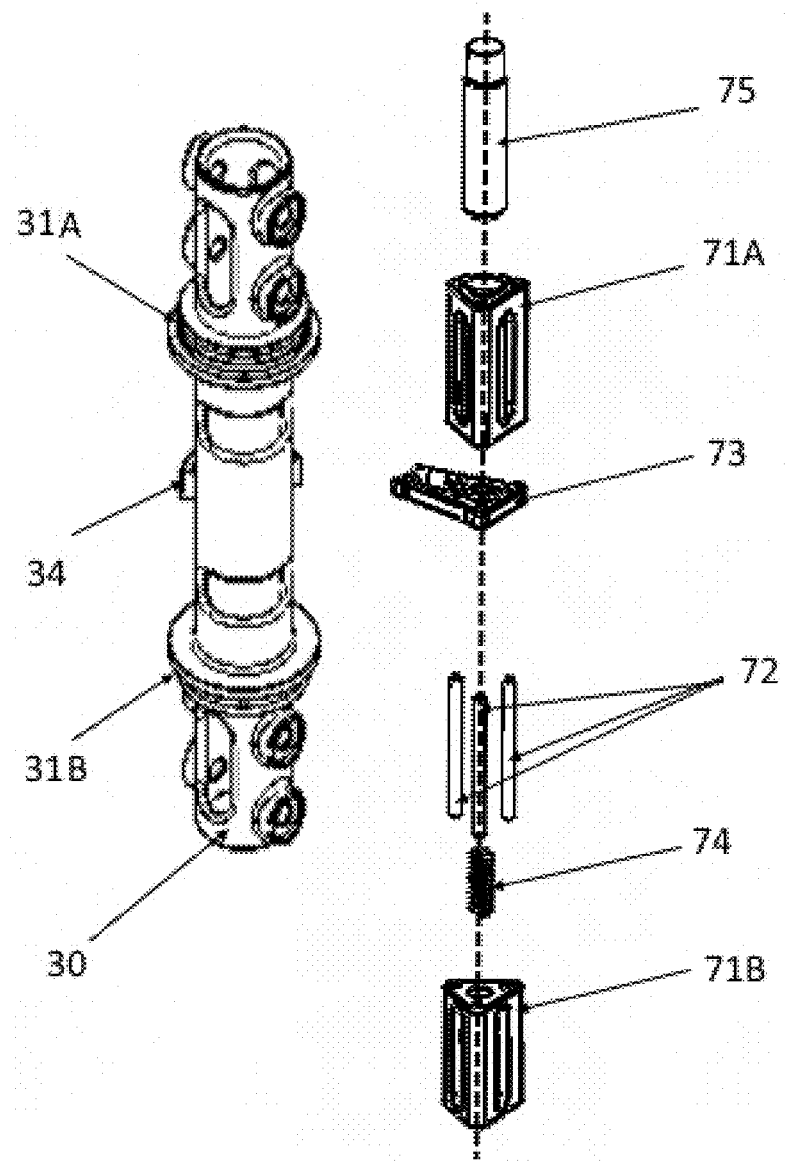
FIG. 6 is an exploded view drawing illustrating components of the embodiment of a motor/propeller arm bracket locking/releasing arrangement illustrated in FIGS. 5A and 5B.

Reference is made to FIG. 6, providing a third perspective view exploded view drawing illustrating components that constitute an advantageous embodiment of the lock arrangement 70 for locking the swing spindle from rotating, thereby locking an associated pair of arms 20A, 20B in a predetermined swing position, which could be at least one of the retracted position or the extended position. In this embodiment, the lock arrangement 70 comprises a lower guide support 71B with a triangular cross section and a bore in an upper portion at each of three corners for receiving and holding a lower portion of one of three guide rods, a return spring 74, three guide rods 72, a cotter pin 73, a cotter pin 73 with three parallel holes in corners of a triangle for sliding on the guide rods 72, an upper guide support 71A with a triangular cross section and a bore in a lower portion at each of three corners for receiving and holding an upper portion of one of the three guide rods and a central bore for accommodating a release button, and an elongated release button long to have an upper end thereof protruding from a top of the upper guide support 71A while a lower end thereof is resting on an upper surface of the cotter pin 73. For reference is also the swing spindle 30 shown in this drawing to illustrate approximately how an end of the cotter pin protruding in a direction of the swing spindle 30 may be at level with a cam portion 34 of the swing spindle 30 when a notch or "valley" in the cam 34 is facing the cotter pin, which notch or "valley" in the cam 34 in this embodiment appears to run for about 180 degrees angle of rotation of the swing spindle 30. For illustration of the means for journaling the swing spindle 30 in the large circular openings in the upper 40A and lower 40B arm attachment brackets, is also shown further details of upper 31A and lower 31B flanges protruding radially outwards on the swing spindle 30 and providing means for holding the swing spindle 30, thereby also the cam portion 34 in position between the upper 40A and lower 40B arm attachment brackets.

I shall be understood that the invention has been explained by way of example and with reference to embodiments of the invention, and that other embodiments that implement the inventive principles and aspects of the invention are also contemplated within the scope of the claims. As an example, an AV implementing invention may be an embodiment in which only upper arms 20A or only lower arms 20B are included, or even other combinations of upper arms 20A or only lower arms 20B than what has been disclosed herein to describe the invention. Similarly, motor supports may be oriented differently from what has been disclosed herein, and arms may be of different design, although only one design has been shown to illustrate and explain the invention.

The invention claimed is:

1. A swingable arm mount for an aerial vehicle having a series of motors connected to respective propellers configured to lift a body of the aerial vehicle, comprising: an upper arm portion having a first motor mount configured to have a first motor of the series of motors mounted to the upper arm portion; a lower arm portion having a second motor mount for mounting a second motor below the first motor, wherein the upper arm portion and lower arm portion are pivotally connected to the aerial vehicle body via an arm bracket of the swingable arm mount, wherein the arm bracket is configured to allow the upper arm portion and lower arm portion to swing from a retracted position to an extended and locked flight position; and wherein the upper arm portion and lower arm portion are elongated arms with the respective first or second motor mounts at a respective first end of the upper arm portion and lower arm portion, and a tubular swing spindle mounted to the second end of each of the upper arm portion and lower arm portion, the arm mount further comprising: a cam on at least a portion of a swing spindle circumference of the swing spindle; first and second arm attachment brackets with openings for rotatably receiving respective first and second portions of the swing spindle, and a locking arrangement including a movable cotter pin configured to selectably contact the cam and configured to move between a locking position with the cotter pin in level with the cam and disposed in a notch or valley of the cam and a release position with the cotter pin not in level with the cam.

2. An aerial vehicle having a series of motors connected to respective propellers and configured to lift a body of the aerial vehicle comprising: a body and a plurality of swingable arm mounts, wherein each of the plurality of swingable arm mounts comprises: an upper arm having a first motor mount configured to have a motor of the series of motors mounted to the upper arm; a lower arm portion having a second motor mount for mounting another motor of the series of motors below the first motor mount, wherein the upper arm and lower arm are pivotally connected to the aerial vehicle body via an arm bracket of the swingable arm mount, wherein the arm bracket is configured to allow the upper arm and lower arm to swing from a retracted position to an extended and locked flight positions and wherein the upper and lower arms are elongated arms with a motor mount at a first end of the arm and a tubular swing spindle mounted to a second end of each of the upper and lower arms, the arm mount further comprising: a cam on at least a portion of a swing spindle circumference of the swing spindle; first and second arm attachment brackets with openings for rotatably receiving respective first and second portions of the swing spindle, and a locking arrangement including a movable cotter pin configured to selectably contact the cam and configured to move between a locking position with the cotter pin in level with the cam and disposed in a notch or valley of the cam and a release position with the cotter pin not in level with the cam.

3. The aerial vehicle of claim 2, comprising four sets of swingable arm mounts.

* * * * *